March 10, 1953 F. L. SYMONDS 2,631,094
NATURAL GAS CONVERSION TO HYDROGEN AND CARBON MONOXIDE
Filed Aug. 31, 1945
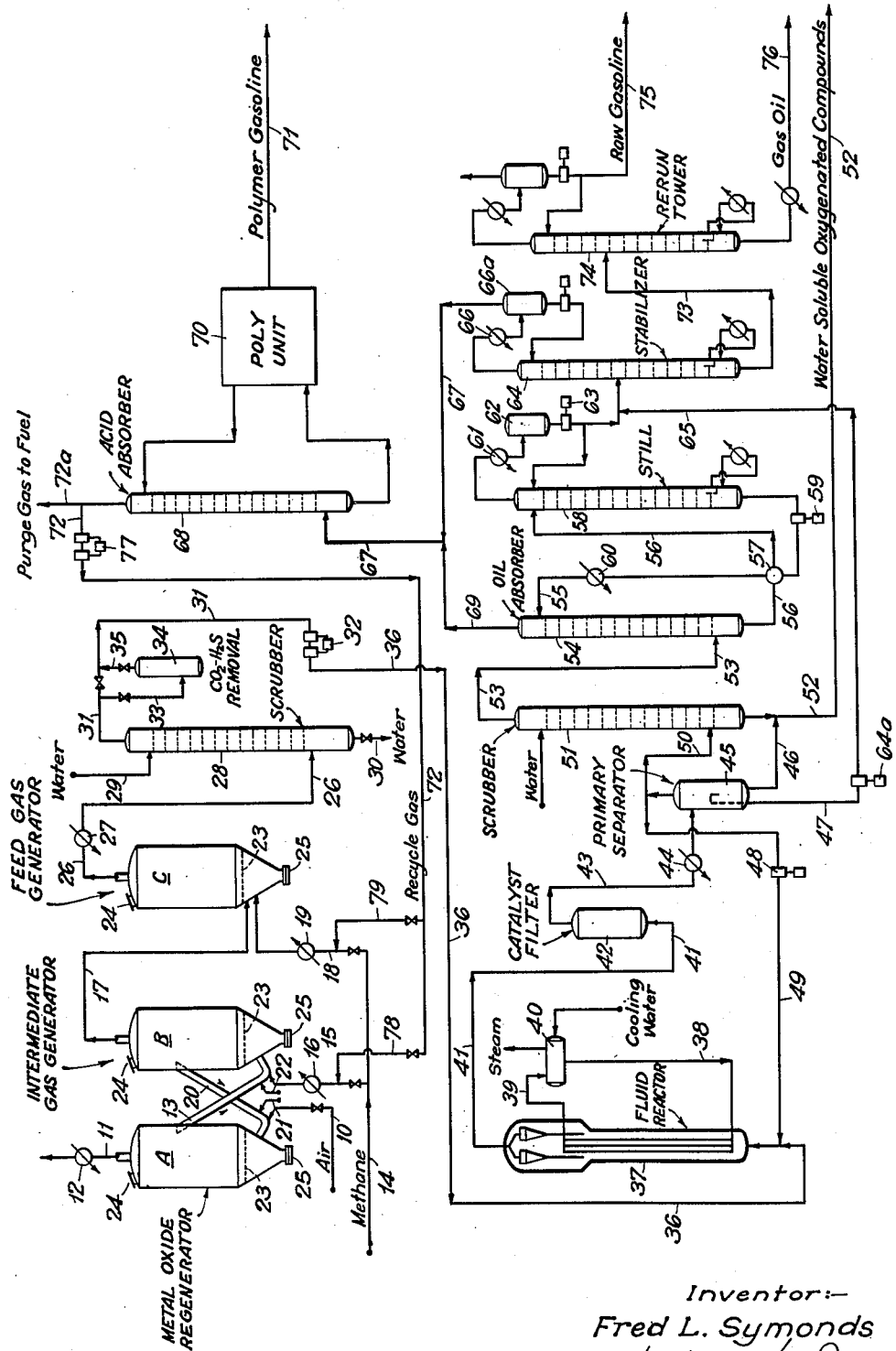
Inventor:—
Fred L. Symonds
By Vandenver Voorhees
Attorney Patented Mar. 10, 1953

2,631,094

UNITED STATES PATENT OFFICE 2,631,094

NATURAL GAS CONVERSION TO HYDROGEN AND CARBON MONOXIDE

Fred L. Symonds, Whiting, Ind., assignor to Standard Oil Company, Chicago, Ill., a corporation of Indiana Application August 31, 1945, Serial No. 613,792

8 Claims. (Cl. 48—196)

This invention relates to a process of preparing a carbon monoxide-hydrogen gas mixture and more particularly to a process of preparing a carbon monoxide-hydrogen gas mixture suitable for use in synthesizing hydrocarbons. The synthesis reaction employing catalysts for making hydrocarbons from hydrogen and carbon monoxide is referred to herein as the "monoxide process" and the gas mixture employed is referred to hereinafter as "feed gas."

The synthesis step of the process is well known and involves conducting a suitable $H_2$-$CO$ mixture over a catalyst at moderately elevated temperatures and pressures. The products are principally motor fuels, heavier oils and paraffin together with some oxygenated compounds and unchanged feed gas. The life of the catalyst is quite long and, the synthesis being highly exothermic, no heat is required but instead special means must be provided for cooling the reaction.

The cost of preparing motor fuels and other products by the monoxide process is ascribed chiefly to the feed gas which must be supplied thereto in tremendous volumes. Thus a plant producing 5000 barrels of motor fuel daily will require 150 million cubic feet of feed gas per day. Numerous methods have been proposed for generating feed gas starting with various raw materials such as coal, coke, or natural gas consisting essentially of methane. Because of the low cost of the latter fuel in certain locations it has appeared especially attractive, but difficulties have been encountered in its use for the preparation of feed gas.

One of the requirements for the monoxide process is that it be substantially free of hydrogen sulfide and that the ratio of hydrogen to CO be in the range of about 1.5 to 3. The preparation of this desirable gas mixture from methane, $CH_4$, requires the addition of oxygen. This may be obtained from air, from water, or it may be supplied as commercial oxygen substantially free of nitrogen. When air is used the feed gas is contaminated with large volumes of nitrogen which prevent any substantial recycling in the system. When water is employed as the source of oxygen the highly endothermic reaction between water and methane requires the addition of a large amount of heat at the high temperature, 1400 to 2000° F., where the reaction proceeds favorably. The use of commercial oxygen is often prevented by the relatively high cost of oxygen manufacture.

It is an object of my process to provide feed gas, substantially nitrogen-free, for the monoxide reaction employing methane or natural gas as the raw material without the use of commercial oxygen. Another object of my process is to produce monoxide feed gas without the use of furnaces requiring expensive heat transfer surfaces for heating highly endothermic reactions at high temperatures. Still another object of my process is to provide a continuous supply of feed gas in large volumes for the monoxide reaction and also provide for recycling unreacted gases from the synthesis reaction after recovering desired hydrocarbon products therefrom, thus obtaining maximum material economy in the process.

My invention is illustrated by a drawing which shows diagrammatically an apparatus suitable for carrying out the process.

Referring to the drawing, three reactors, A, B and C, are employed for the principal reactions in feed gas preparation. These reactors may be similarly constructed and are suitably vertical, cylindrical, steel drums lined with refractories to withstand the high temperatures employed in the feed gas generation. Between the refractory lining and the steel shell there is preferably employed an insulating brick or other insulating lining to protect the steel shell and conserve heat. A similar construction is employed in the conduits connecting the reactors A, B and C.

In reactors A and B, I employ a finely granular or powdered metal oxide which serves as an oxygen carrier between the two reactors. Air is admitted by line 10 to the base of reactor A and serves to maintain the metal oxide therein in fluidized dense suspension. At the top of the reactor the air or rather the residual nitrogen from the air is disengaged from the fluidized mass of oxide and passes off thru discharge line 11 leading to the stack. Heat exchanger or economizer 12 is also employed to recover part of the heat in the waste nitrogen.

The oxide suspension in oxidizer A is next conducted by downcomer 13 to the base of intermediate gas generator B wherein it is contacted with a stream of preheated methane supplied by lines 14 and 15 and preheated by heat exchanger 16. The portion of hot metal oxide supplied to the reactor B is in excess of that required to oxidize to $CO_2$ and $H_2O$ all the methane admitted by line 15. This reaction is highly exothermic and serves to raise the temperature of the metal oxide sufficiently to effect dissociation thereof with the liberation of oxygen. The resulting gaseous reaction products pass upwardly thru reactor B serving to maintain the metal oxide therein in dense fluidized suspension. The hot gaseous products are disengaged at the top of the reactor and thence are conducted by line 17, without cooling and at a temperature of about 1500 to 3000° F., to the base of reactor C which is the final feed gas generator. In reactor C the hot intermediate gases from B are admixed with additional methane supplied by line 18 and preheated in exchanger 19, sufficient methane being introduced to react with all the oxygen and reduce a substantial part of the $CO_2$ in the intermediate gases to CO. The oxidation of this methane by oxygen is a highly exothermic reaction and serves to balance in part the heat lost in the endothermic reduction of $CO_2$. The reduction of $CO_2$ is also assisted by the sensible heat of the intermediate gases supplied to generator C by line 17.

The reduced metal oxide in reactor B is conducted by downcomer 20 to the base of regenerator A. The stream of fluidized oxide in conduits 13 and 20 is maintained in free-flowing fluidized form by the introduction of aeration gas at 21 and 22 and the gas so introduced may also serve as a stripping medium to prevent the transfer of undesirable gases from regenerator A to reactor B. Thus steam may be introduced at 22, pass upwardly thru line 13, and be discharged with the nitrogen thru line 11.

Reactor C may be an empty chamber but it is preferred to employ an oxidation-reduction catalyst therein to hasten the reaction of $CO_2$ reduction. The catalyst may be fixed in position, i. e. may form a loose granular bed or checkerwork of coated brick or porous packing material, or I may employ a finely granular catalyst which is maintained in fluidized dense suspension by the upflowing stream of gases passing thru the regenerator. A granular material having a mesh size of 10 to 100 mesh is very satisfactory. A suitable catalyst is active alumina such as alumina gel, bauxite, etc., promoted with an oxide of a metal of group VI of the periodic system, preferably chromium or molybdenum oxide. Various other catalyst compositions may be employed for the purpose of rapidly effecting the decomposition of methane and the reduction of $CO_2$ in regenerator C, such metals as vanadium, manganese, cobalt, nickel, iron, copper and zinc being frequently employed for this purpose, generally in combinations with each other and with magnesia and alumina supports.

The temperature of the reactors A and B is largely dependent upon the characteristics of the metal oxide-oxygen carrier employed therein. A suitable metal oxide for the purpose is a mixture of cuprous and cupric oxides. Using these oxides of copper the temperature in the intermediate gas generator B should be maintained at about 1900 to 1950° F. Accurate temperature control is easily obtained by regulating the amount of hydrocarbon gas introduced thru valved line 15, only sufficient gas being introduced to provide the desired temperature. Excessive temperatures, besides being uneconomical, should be avoided in order to prevent fusion of the metal oxide. Other oxides are those of chromium and molybdenum.

The temperature in regenerator A should be about 200 to 400° F. below that of reactor B and this temperature differential may be obtained by the use of an indirect heat exchanger or cooler for the stream of fluidized metal oxide flowing thru line 20 and by the cooling effect of the air introduced by line 10, large volumes of which are required to reoxidize the metal oxide. The heat lost to the nitrogen in this operation is not entirely lost from the system, since much of it is recovered in heat exchanger 12 and in the heat exchanger employed for cooling the metal oxide stream in line 20 where such a cooler is employed.

When using copper oxide the temperature required for dissociation of oxygen therefrom in gas generator B may be reduced by the addition to the copper oxide of various promoters such as small amounts of manganese, vanadium, chromium, molybdenum and nickel. Other oxygen carriers may also be employed, the principal requirement being that they be oxidizable in regenerator A at temperatures in the approximate range of 1200 to 2000° F. and be dissociated in reactor B at somewhat higher temperatures generally within the range of 1500 to 2200° F.

The temperature employed in feed gas generator C is usually about 1400 to 1800° F., lower temperatures in this range being employed where catalysts are used. If the temperature is too low the reduction of $CO_2$ is incomplete and likewise unreacted methane is permitted to pass thru into the subsequent monoxide synthesizer hereinafter described. The temperature of generator C can be generally stated as lying within the water gas reaction range.

Each of the reactors A, B and C is preferably equipped with a distributing grid 23 whereby the gas stream charged to the reactor is evenly introduced thru the bed of fluidized solids therein. The velocity of gases flowing upwardly thru the reactors should be sufficient to maintain the solids in turbulent dense suspension but should not exceed the velocity at which the solids begin to be carried out of the reactor with the gases. Obviously this critical carry-over velocity will vary depending upon the particle size and density of the oxides used in reactors A and B. In general the upward gas velocity in the reactors A and B occupied by fluidized metal oxide will lie within the range of about 2 to 10 feet per second. This gas velocity can also be employed in generator C when a fluidized solid catalyst is employed therein.

Loss of solids by entrainment in the gases withdrawn from the top of reactors A, B and C may be largely reduced or prevented by the use of suitable cyclone separators not shown. These may conveniently be placed within the reaction vessels with dip legs extending downwardly into the fluidized solids mass to return separated solids thereto. Charging ports 24 and discharge ports 25 are provided for introducing solids into the reactors and removing them therefrom when desired. These ports may be closed by covers suitably insulated from the high temperatures maintained within the reactors.

From the generator C the gases comprising carbon monoxide, hydrogen and water vapor together with some unreduced carbon dioxide are conducted by line 26 thru cooler or heat exchanger 27 and thence to wash tower 28 where the gases are washed with a stream of cold water, further reducing temperature, and removing therefrom catalyst dust which may have carried over from generator C. Water is admitted to the scrubber by line 29 and removed by line 30.

From scrubber 28 the washed gases are conducted by line 31 leading to compressor 32 where the pressure is raised to the point desired for operation of the synthesizer, usually about 50 to 250 p. s. i. If desired, $CO_2$ may be removed from the gases before synthesis by diverting them thru valved line 33 into lime tower 34 thence by line 35 to compressor 32. Tower 34 may also serve to remove any hydrogen sulfide present in the gases. Other alkaline absorbents besides lime such as sodium carbonate, triethanolamine, etc. may be employed for this purpose and $CO_2$ may be recovered for use as hereinafter described.

From compressor 32 the washed gases are led by line 36 into synthesis reactor 37 where the gases contact the usual cobalt or iron catalyst, preferably in finely divided form maintained in fluid, dense suspension by upflowing gases. When the cobalt catalyst is used the temperature in reactor 37 is usually maintained at about 400 to 500° F. whereas when the iron catalyst is employed temperatures of the order of 500 to 650° F. are suitable.

Exothermic heat of reaction is dissipated in reactor 37 by suitable cooling coils within the reactor thru which a cooling fluid, for example water, may be recycled by lines 38 and 39, the steam being separated and withdrawn from boiler 40. It is preferred that the catalyst in 37 be maintained in turbulent motion in order to obtain optimum temperature control.

The reaction products from synthesizer 37 are conducted by line 41 to catalyst filter 42 where any entrained catalyst carried over from reactor 37 is recovered. The gases then pass by line 43 thru cooler 44 into primary separator 45 to separate out water and water-soluble oxygenated compounds which are drawn off from the separator at the bottom by line 46. Condensed oils collecting in separator 45 are trapped off by line 47 leading to a stabilizer as hereinafter described.

Uncondensed gases withdrawn from the top of primary separator 45 may be conducted in part by pump 48 in line 49 back to reactor 37 but these gases are principally conducted by line 50 to water scrubber 51 wherein additional water-soluble reaction products, aldehydes, alcohols, etc., are extracted and discharged by line 52 with the oxygenated water-soluble products previously referred to.

From the top of scrubber 51 the gaseous products are then conducted by line 53 to oil absorber 54 wherein oil-soluble products particularly the $C_4$ and heavier hydrocarbons are recovered by a suitable absorber oil supplied by line 55. The rich oil is withdrawn by line 56, heat-exchanged in 57 and stripped in stripper 58. The absorber oil is conducted from the base of the stripper by pump 59 leading back thru cooler 60 to the top of absorber 54.

Absorption naphtha from stripper still 58 is condensed in condenser 61 and thence passes thru reflux drum 62 and pump 63 into stabilizer 64 where it is stabilized together with the primary separator oil from line 47, pump 64a and line 65. The $C_3$ and other gases which are removed in the stabilizer are conducted thru condenser 66 to reflux drum 66a, thence by line 67 to absorber tower 68 where unsaturated hydrocarbons, chiefly propylene and butylenes, are absorbed therefrom. The unabsorbed gases from 54 are also discharged to the absorber 68 via line 69. The olefins absorbed in tower 68, for example by the action of sulfuric acid or phosphoric acid, can be polymerized as indicated at 70 and recovered as polymer gasoline by line 71. The unabsorbed gases from tower 68 are then recycled by line 72 back to the feed gas preparation step of the process or discarded thru line 72a.

The liquid motor fuel products recovered in stabilizer 64 are withdrawn by line 73 and redistilled in fractionator 74, the gasoline fraction being withdrawn by line 75 as a distillate and the residue withdrawn at the base by line 76. The heavy fraction has been found to be particularly valuable as diesel fuel.

The recycle gas in line 72 is comprised principally of methane together with some ethane and propane produced in the synthesis reaction and some unreacted hydrogen and carbon monoxide. In addition the recycle gas may contain $CO_2$ providing that was not previously removed before the synthesis operation. This gas mixture is conducted by pump 77 back to the intermediate gas generator B by valved line 78 or to the feed gas generator C by valved line 79. In either case it is desirable to preheat the recycle gases in heat exchangers 16 or 19 before admitting them into the gas generators. Where carbon dioxide is removed by scrubber 34 it is desirable to recover this gas and recycle it to one or both of the gas generators B and C in order to regulate the ratio of hydrogen to carbon monoxide in the gas produced in line 26. By introducing carbon dioxide in this way the ratio, $H_2:CO$, is reduced.

On account of the large volume of $CO_2$ obtained in intermediate gas generator B, it is not generally necessary to add $CO_2$ but instead it may be necessary to add hydrogen to increase the ratio, $H_2:CO$ in the feed gas.

Although I have described my invention as it is particularly related to the monoxide synthesis of higher hydrocarbons, it should be understood that the scope of the invention is determined by the following claims.

I claim:

1. The process of preparing a mixture of carbon monoxide and hydrogen from gaseous hydrocarbon components of natural gas which comprises injecting a controlled stream of the natural gas into a fluidized bed of finely divided reducible metal oxide in turbulent suspension in a first reaction zone, maintaining turbulent suspension by the upflowing stream of gas, oxidizing said gas therein at a temperature in the range of about 1500 to 3000° F. to convert said hydrocarbons completely into carbon dioxide and water vapor by the oxidizing effect of said metal oxide, thereby reducing said metal oxide, transferring said reduced metal oxide in a fluidized stream from said first reaction zone to a separate regeneration zone wherein it is contacted with air and thereby reoxidized, returning the reoxidized metal oxide in a fluidized stream to said first reaction zone, conducting hot gaseous products from said first reaction zone into a second reaction zone in contact with additional quantities of said natural gas, maintaining the temperature of said second reaction zone within the range of about 1200 to 2000° F. by the heat of said hot gaseous products, thereby effecting reduction of carbon dioxide from said first reaction zone and decomposition of said added natural gas, and withdrawing from said second reaction zone a gaseous mixture comprising carbon monoxide and hydrogen.

2. The process of preparing a mixture of carbon monoxide and hydrogen from gaseous hydrocarbon components of natural gas which comprises injecting a controlled stream of the natural gas into a fluidized bed of finely divided reducible metal oxide in turbulent suspension in a first reaction zone, maintaining turbulent suspension by the upflowing stream of gas, oxidizing said gas therein to convert said hydrocarbons completely into carbon dioxide and water vapor by the oxidizing effect of said metal oxide, thereby reducing said metal oxide, transferring said reduced metal oxide in a fluidized stream from said first reaction zone to a separate regeneration zone wherein it is contacted with air and thereby reoxidized, returning the reoxidized metal oxide in a fluidized stream to said first reaction zone, conducting hot gaseous products from said first reaction zone into a second reaction zone in contact with additional quantities of said natural gas, maintaining the temperature of said second reaction zone by the heat of said hot gaseous products, thereby effecting reduction of carbon dioxide from said first reaction zone and decomposition of said added natural gas, and withdrawing from said second reaction zone a gaseous mixture comprising carbon monoxide and hydrogen.

3. The process of preparing carbon monoxide-hydrogen feed gas suitable for the synthesis of higher hydrocarbons by the monoxide process which comprises injecting methane into a fluidized suspension of a readily dissociable metal oxide maintained in a first reaction zone, wherein said methane is completely oxidized to $CO_2$ and water with liberation of heat, controlling the amount of methane to raise the temperature of said metal oxide suspension above its dissociation temperature thereby liberating oxygen in said reaction zone, withdrawing from said reaction zone a hot gaseous mixture containing $H_2O$, $CO_2$ and $O_2$, conducting said gaseous mixture to a second reaction zone, injecting into said second reaction zone additional methane sufficient to combine with all the oxygen in said gas mixture and to reduce at least part of said carbon dioxide with the production of carbon monoxide and hydrogen and withdrawing from said second reaction zone the resulting gaseous mixture comprising carbon monoxide and hydrogen.

4. The process of preparing carbon monoxide-hydrogen feed gas suitable for the synthesis of higher hydrocarbons by the monoxide process which comprises injecting methane into a fluidized suspension of a readily dissociable metal oxide maintained in a first reaction zone at a temperature between about 1500 and 3000° F., wherein said methane is completely oxidized to $CO_2$ and water with liberation of heat, controlling the amount of methane to raise the temperature of said metal oxide suspension above its dissociation temperature thereby liberating oxygen in said reaction zone, withdrawing from said reaction zone a hot gaseous mixture containing $H_2O$, $CO_2$ and $O_2$, conducting said gaseous mixture to a second reaction zone maintained at a temperature within the range of about 1200 to 2000° F., injecting into said second reaction zone additional methane sufficient to combine with all the oxygen in said gas mixture and to reduce at least part of said carbon dioxide with the production of carbon monoxide and hydrogen and withdrawing from said second reaction zone the resulting gaseous mixture comprising carbon monoxide and hydrogen.

5. The process of claim 4 wherein a finely divided oxidation-reduction catalyst is maintained in said second reaction zone to facilitate the rapid reduction of $CO_2$ to $CO$.

6. The process of claim 4 wherein said metal oxide suspension is continuously transferred from said first reaction zone to a regeneration zone wherein it is reoxidized by contact with air at a lower temperature than that of said first reaction zone and then transferred back to said first reaction zone for oxidation of additional quantities of methane therein.

7. The process of claim 4 wherein the said metal oxide is copper oxide.

8. The process of producing hydrogen and carbon oxides which comprises maintaining in an oxidation zone a dense turbulent fluidized bed of finely divided solid oxygen acceptor selected from the group consisting of metal oxides readily oxidizable by air to form a solid oxygen compound giving off oxygen when heated, passing air upwardly through said bed at a temperature adapted to promote the conversion of said oxygen acceptor into said oxygen compound, withdrawing residual air overhead from said oxidation zone, downwardly withdrawing fluidized oxygen compound from said oxidation zone, passing said fluidized oxygen compound to a dissociation zone to form therein a dense turbulent fluidized bed of finely divided oxygen compound, burning a fuel within said dissociation zone in amounts sufficient at least to generate the heat required to liberate a substantial proportion of the oxygen content of said oxygen compound, recovering a gas containing oxygen, carbon dioxide and steam overhead from said dissociation zone, reacting said gas with methane to form substantial amounts of CO and $H_2$, downwardly withdrawing fluidized solid reduced oxygen compound from said dissociation zone and returning said reduced oxygen compound to said oxidation zone.

FRED L. SYMONDS.

REFERENCES CITED

The following references are of record in the file of this patent:

UNITED STATES PATENTS

| Number | Name | Date |
|---|---|---|
| 1,951,774 | Russell et al. | Mar. 20, 1934 |
| 1,957,743 | Wietzel | May 8, 1934 |
| 1,984,380 | Odell | Dec. 18, 1934 |
| 2,178,824 | Atwell | Nov. 7, 1939 |
| 2,185,989 | Roberts, Jr. | Jan. 2, 1940 |
| 2,224,048 | Herbert | Dec. 3, 1940 |
| 2,243,869 | Keith | June 3, 1941 |
| 2,274,064 | Howard et al. | Feb. 24, 1942 |
| 2,341,193 | Scheineman | Feb. 8, 1944 |
| 2,347,682 | Gunness | May 2, 1944 |
| 2,425,754 | Murphree et al. | Aug. 19, 1947 |

FOREIGN PATENTS

| Number | Country | Date |
|---|---|---|
| 10,759 of 1887 | Great Britain | June 8, 1888 |
| 12,155 of 1892 | Great Britain | May 6, 1893 |